United States Patent [19]

Taki

[11] Patent Number: 5,618,638
[45] Date of Patent: Apr. 8, 1997

[54] OPTICAL MAGNETIC RECORDING MEDIUM

[75] Inventor: Kazunari Taki, Nagoya, Japan

[73] Assignee: Brother Kogyo Kabushiki Kaisha, Nagoya, Japan

[21] Appl. No.: 71,617

[22] Filed: Jun. 4, 1993

Related U.S. Application Data

[63] Continuation of Ser. No. 631,402, Dec. 21, 1990, abandoned.

[30] Foreign Application Priority Data

Jan. 29, 1990 [JP] Japan ..................... 2-18174

[51] Int. Cl.$^6$ ..................................... G11B 5/66
[52] U.S. Cl. ............... 428/694 ML; 428/694 EC; 428/694 DE; 428/694; 428/694 RL; 428/694 TM; 428/694 BM; 428/900; 369/13; 369/272; 369/275.1; 369/277; 369/283; 369/286
[58] Field of Search ..................... 428/694 MM, 428/694 DE, 694 EC, 694 TM, 694, 694 BM, 694 RL, 694 ML, 900; 369/272, 275.1, 13, 277, 283, 286

[56] References Cited

U.S. PATENT DOCUMENTS

| | | | |
|---|---|---|---|
| 3,224,333 | 12/1965 | Kolk, Jr. et al. | 365/122 |
| 4,481,620 | 11/1984 | Murakami | 369/275 |
| 4,518,657 | 5/1985 | Yanagida | 428/450 |
| 4,556,291 | 12/1985 | Chen | 359/282 |
| 4,753,853 | 6/1988 | Sato et al. | 428/694 |
| 4,839,226 | 6/1989 | Sawada et al. | 428/336 |
| 4,855,975 | 8/1989 | Akasaka et al. | 369/13 |
| 5,089,358 | 2/1992 | Taki et al. | 428/694 DE |

FOREIGN PATENT DOCUMENTS

| | | |
|---|---|---|
| 75306 | 1/1988 | Australia . |
| 258978 | 3/1988 | European Pat. Off. . |
| 57-66537 | 4/1982 | Japan . |
| 57-164418 | 10/1982 | Japan . |
| 2-15441 | 1/1990 | Japan . |

OTHER PUBLICATIONS

Ohta, et al; "Magneto-optical Disk with a Reflecting Layer" pp. 18a-18d; Aug. 22, 1985.

"High Speed Overwritable Magneto-Optic Recording", T. Nakao et al., Proc. Int. Symp. on Optical Memory, 1987, Japanese Journal of Applied Physics, vol. 26 (1987) Supp. 26-4, pp. 149-154.

Primary Examiner—Leszek Kiliman
Attorney, Agent, or Firm—Oliff & Berridge

[57] ABSTRACT

An optical-magnetic recording medium comprising a tracking guide layer and a recording layer disposed on a substrate in which the recording layer is made of a magnetic material having a certain Curie temperature and the guide layer is made of a magnetic material having a certain compensation temperature. Overwriting is conducted on the recording layer of the optical-magnetic recording medium, by previously applying an external magnetic field in the direction of the initial magnetization to the recording medium, and under this state, heating the recording layer higher than the Curie temperature by the irradiation of light, thereby degaussing the recording layer and, at the same time, heating the guide layer higher than the compensation temperature or not heating the layer selectively in accordance with information to be overwritten.

25 Claims, 5 Drawing Sheets

(a)

(b)

(c)

(a)

(b)

OPTICAL MAGNETIC RECORDING MEDIUM

This is a Continuation of application Ser. No. 07/631,402 filed Dec. 21, 1990, now abandoned.

BACKGROUND OF THE INVENTION

1. Field of the Invention

The present invention relates to an optical-magnetic recording medium and, more particularly, to an optical-magnetic recording medium used in an optical-magnetic recording apparatus for recording and erasing information by means of a laser beam, as well as an optical-magnetic recording/erasing system for the recording medium.

2. Description of the Related Art

As an optical-magnetic recording medium used in an optical-magnetic recording apparatus for recording, reproducing and erasing information by means of a laser beam, a recording medium comprising a transparent substrate made of materials such as polycarbonate or glass having tracking guide grooves formed therein and a magnetic recording layer made of materials such as TbFeCo or GdTbFe formed on the substrate by means of sputtering or vacuum deposition has been usually used. Recording of information on such a recording medium is conducted by irradiating the recording layer using a laser beam modulated with the information, heating the film to a temperature higher than the Curie temperature and applying a magnetic field in a certain direction, thereby directing the magnetization in the recording layer to the direction of the applied magnetic field. Further, erasing of the information is conducted by irradiating the recording layer with a laser beam and applying a magnetic field in the direction opposite to that at the time of recording, thereby directing the magnetization in the magnetic layer to the direction opposite to that at the time of recording. There is also known a magnetic field modulation system in which the direction of the applied magnetic field is changed by using a magnetic head or the like while continuously irradiating the recording layer with a laser beam at a constant intensity, by which the information can also be recorded and erased.

However, in the system of applying a magnetic field in a certain direction and irradiating the recording layer with a laser beam modulated with information only either recording or erasing can be conducted by the laser beam irradiation. A so-called overwriting of erasing information already recorded in the recording layer and simultaneously recording of new information can not be conducted. On the other hand, the overwriting is possible by the magnetic field modulation system but, since high speed inversion of the applying direction of the magnetic field is difficult, there is a drawback in that the recording speed is slow.

SUMMARY OF THE INVENTION

Accordingly, it is an object of the present invention to overcome the above-mentioned problems and to provide an optical-magnetic recording medium capable of overwriting at a high speed.

The foregoing and other objects and advantages can be attained by an optical-magnetic recording medium according to the present invention comprising a tracking guide layer and a recording layer disposed on a substrate, in which the recording layer comprises a magnetic material having a certain Curie temperature and the guide layer comprises a magnetic material having a certain compensation temperature.

Another object of the present invention is to provide an optical-magnetic overwriting system capable of overwriting the optical-magnetic recording medium described above at a high speed.

The foregoing and other objects and advantages can be attained by an optical-magnetic overwriting system according to the present invention, which comprises applying an external magnetic field in an initial magnetization direction to an optical-magnetic recording medium in which information has already been recorded in the recording layer, heating the recording layer under this state to a temperature higher than the Curie temperature by irradiation of light, thereby conducting demagnetization and, simultaneously, heating the guide layer to a higher compensation temperature or not heating the layer, thereby reversing or not reversing the magnetization, respectively, in accordance with the overwritten information, and conducting magnetization recording (overwriting) upwardly or downwardly to the demagnetized recording layer depending on a comparison of the intensity between the external magnetic field described above and a counter magnetic field formed in the light irradiated area of the recording layer.

BRIEF DESCRIPTION OF THE DRAWINGS

The present invention will be described in detail with reference to the following drawings, wherein.

DETAILED DESCRIPTION OF THE PREFERRED EMBODIMENTS

A detailed description of a preferred embodiment of an optical-magnetic recording medium embodying the present invention will now be given with reference to the accompanying drawings.

Figure 1:
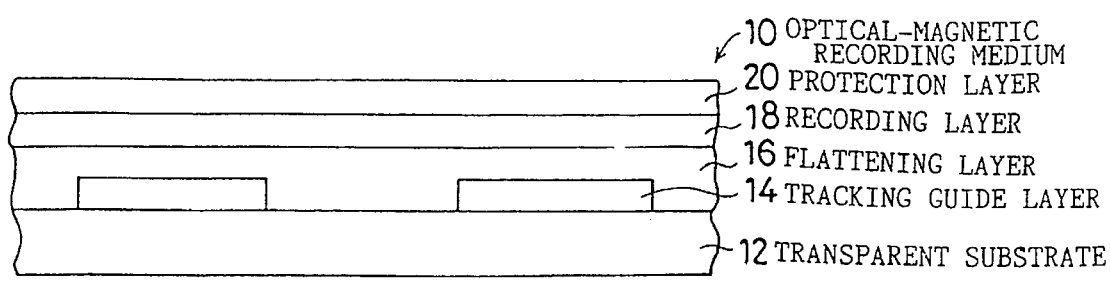
FIG. 1 is a cross sectional view for a principal portion of an optical-magnetic recording medium in a preferred embodiment according to the present invention.

FIG. 1 is a cross sectional view of a principal portion of an optical-magnetic recording medium 10 of one embodiment of the present invention. The optical-magnetic recording medium 10 is formed by successively laminating, on a transparent substrate 12 made of glass or the like, a tracking guide layer 14, a flattening layer 16, a recording layer 18 for optical-magnetic recording and a protection layer 20.

The guide layer 14 is formed of a magnetic film made of an amorphous alloy of rare earth transition metals such as TbFeCo, GdTbFe, TbCo or GdFe. The composition of the magnetic film will be described in detail in the subsequent explanation of the magnetization-temperature characteristics with reference to FIGS. 2(a) and (b). The guide layer 14 is formed on the substrate 12, for instance, in a concentrical or spiral shape (although not illustrated) like that in the conventional optical-magnetic recording medium of this type. Such a shape is prepared by well-known photolithography. That is, a magnetic film as a material for the guide layer 14 is formed on one surface of the substrate 12 by a sputtering or vacuum deposition technique so as to be coated with a photoresist as by a spin coating technique or the like. Then, the resist is photo-cured spirally or concentrically and the uncured part of the resist is removed by a laser exposure method or the like. Further, the magnetic film wherein a portion of the photoresist has been removed is etched using an acidic solution or plasma. Finally, a tracking guide layer 14 is formed by removing the photoresist using an organic solvent or the like. The flattening layer 16 is formed by supplying and coating a liquid metal alkoxide such as Si, Ti or Zr while rotating the substrate 12 formed with the guide layer 14 by a rotational coating method and solidifying the same by heating at a high temperature (about 150° to 300° C.), thereby forming a metal oxide film, for example, of $SiO_2$, $TiO_2$ or $ZrO_2$. Thus, gaps in the guide layer 14 are buried and the surface of the flattening layer 16 is substantially flattened.

Figure 2A:
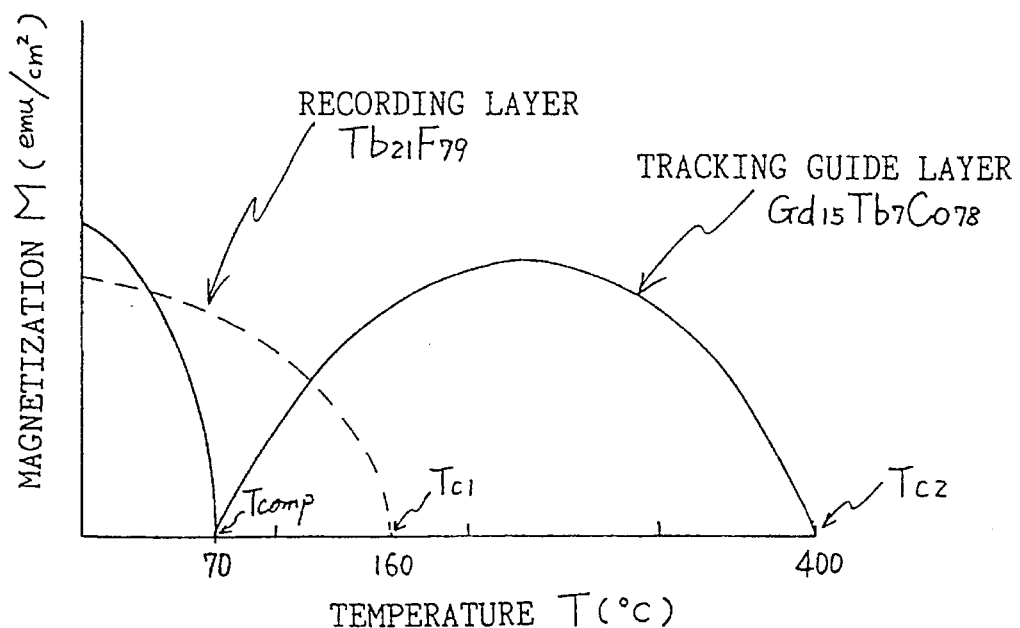
FIGS. 2(a) and (b) graphically show magnetization-temperature characteristics of the guide layer and the recording layer.
Figure 2B:
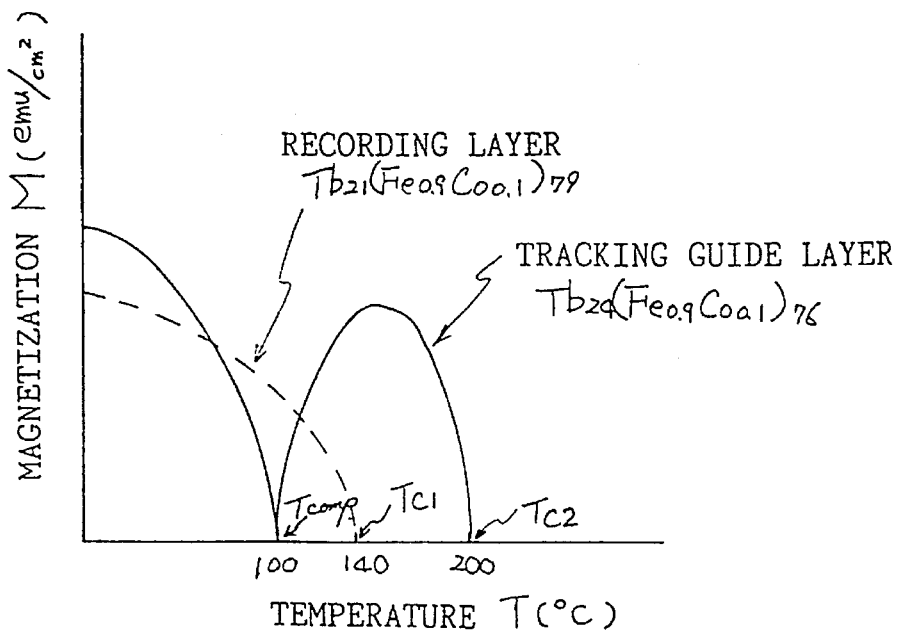

The recording layer 18, also described subsequently in detail with reference to FIG. 2, is formed of a magnetic film comprising an amorphous alloy of rare earth transition metals having a structure and ingredients different from those of the guide layer. The recording layer 18 is also formed by a well-known sputtering or vacuum deposition method. An explanation will now be made of magnetization-temperature characteristics of the material for the guide layer 14 and the recording layer 18 with reference to FIGS. 2(a) and (b). Referring first to FIG. 2(a), Gd15Tb7Co78 is used as the material for the guide layer 14, while a different kind of alloy, Tb21Fe79, is used as the material for the recording layer 18. As shown in this embodiment, the compensation temperature Tcomp at which the direction of the magnetization of the guide layer 14 is reversed is approximately 70° C. and the Curie temperature $T_{c1}$ at which the magnetization of the recording layer 18 is degaussed is approximately 160° C. The Curie temperature $T_{c2}$ of the guide layer 14 is approximately 400° C. Referring then to FIG. 2(b), $Tb_{24}(Fe_{0.9}Co_{0.1})_{76}$ is used as the material for the guide layer 14 and $Tb_{21}(Fe_{0.1}Co_{0.1})_{79}$ of the same kind of the alloy is used as the recording layer 18. It is shown in this embodiment that the compensation temperature Tcomp at which the magnetization of the guide layer 14 is reversed is about 100° C., while the Curie temperature $T_{c1}$ at which the magnetization of the recording layer 18 is degaussed is 140° C. The Curie temperature $T_{c2}$ of the guide layer 14 is about 200° C. As shown in FIGS. 2(a) and (b), a characteristic feature is that the recording layer 18 has the Curie temperature $T_{c1}$, while the guide layer 14 has the compensation temperature $T_{comp}$ lower than the Curie temperature of the recording layer 18 at which the direction of the magnetization is reversed.

The protection layer 20 is disposed to protect the recording layer 18 from any chemical change. Layer 20 is made of $SiO_2$, AlN or the like and is formed by a vapor deposition or sputtering method. The protection film 20 may be made of the same material and by the same manufacturing method as those of the flattening layer 16.

Figure 3:
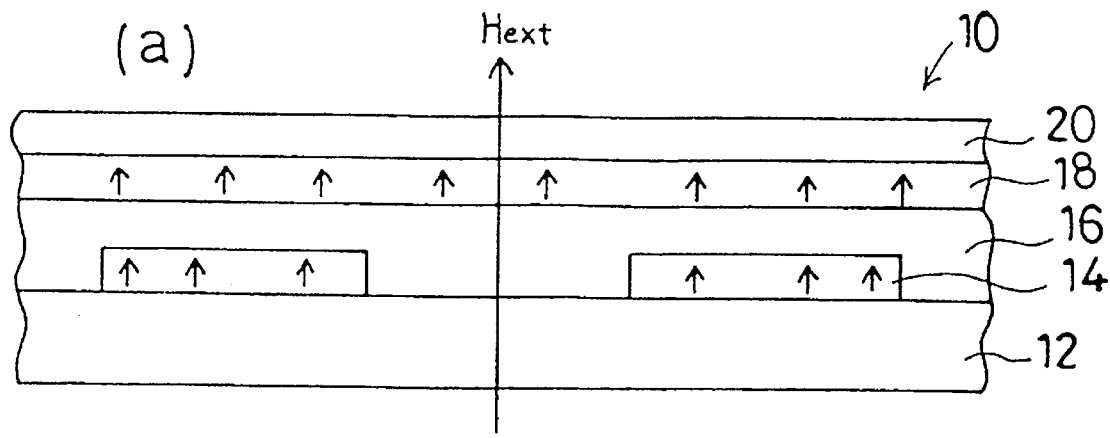
FIGS. 3(a) through (c) are explanatory views for the principle of recording in the optical-magnetic recording medium.
Figure 3:
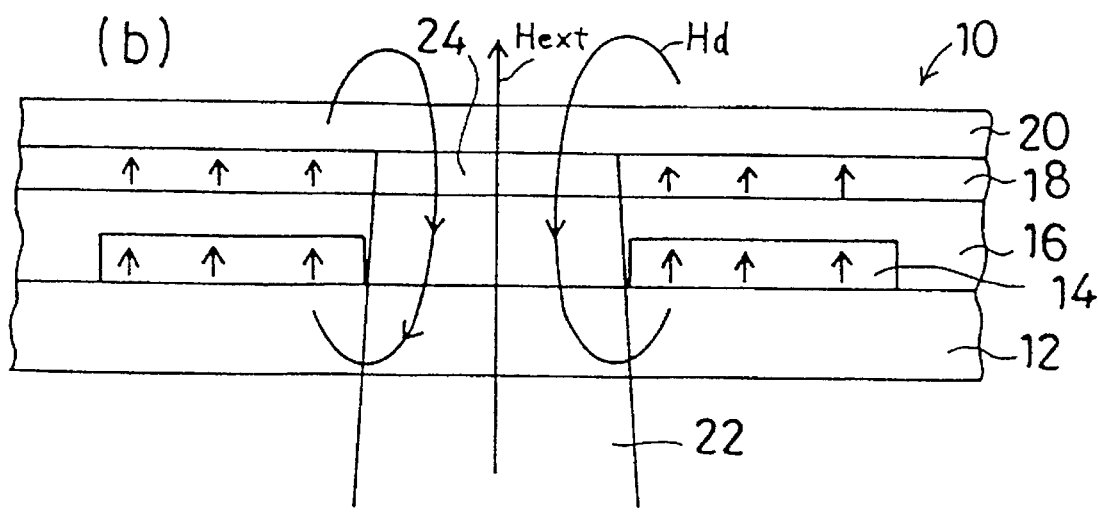
Figure 3:
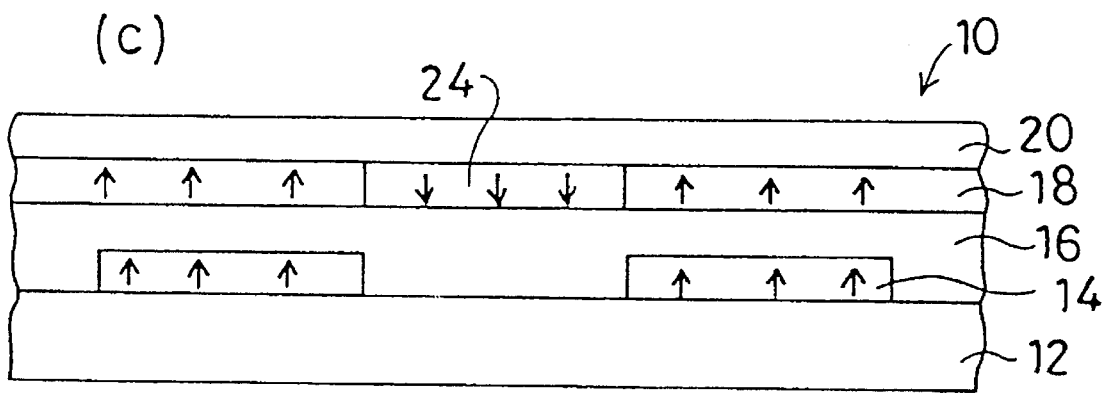

FIGS. 3(a) through (c) illustrate executing recording to the optical-magnetic recording medium 10 described above. Assuming that the recording layer 18 and the guide layer 14 are magnetized previously in the direction of the initial magnetization (upward direction), as shown in FIG. 3(a), a weak external magnetic field Hext is applied in the same direction as the initial magnetization direction, that is, along the upward direction. The intensity of the magnetic field $H_{ext}$ will be described later. Then, as shown in FIG. 3(b), a laser beam 22 radiates from an optical head or the like (not illustrated) to heat the light irradiation area 24 of the recording layer 18 to a temperature higher than the Curie temperature $T_{c1}$. Thus, the light irradiation area 24 of the recording layer 18 is demagnetized, and a counter magnetic field Hd due to the effect of the magnetic fluxes of the light non-irradiation area of the recording layer 18 and the guide layer 14 is caused at the light irradiation area 24 of the recording layer 18. It is necessary here that conditions are set such that the intensity of the external magnetic field $H_{ext}$ is less than that of the counter magnetic field Hd where $H_{int}$ is the A synthetic magnetic field of the two magnetic fields Hd and $H_{ext}$ is directed downwardly, the laser beam irradiation area 24 of the recording layer 18 is magnetized downwardly and information is recorded as shown in FIG. 3(c).

Figure 4:
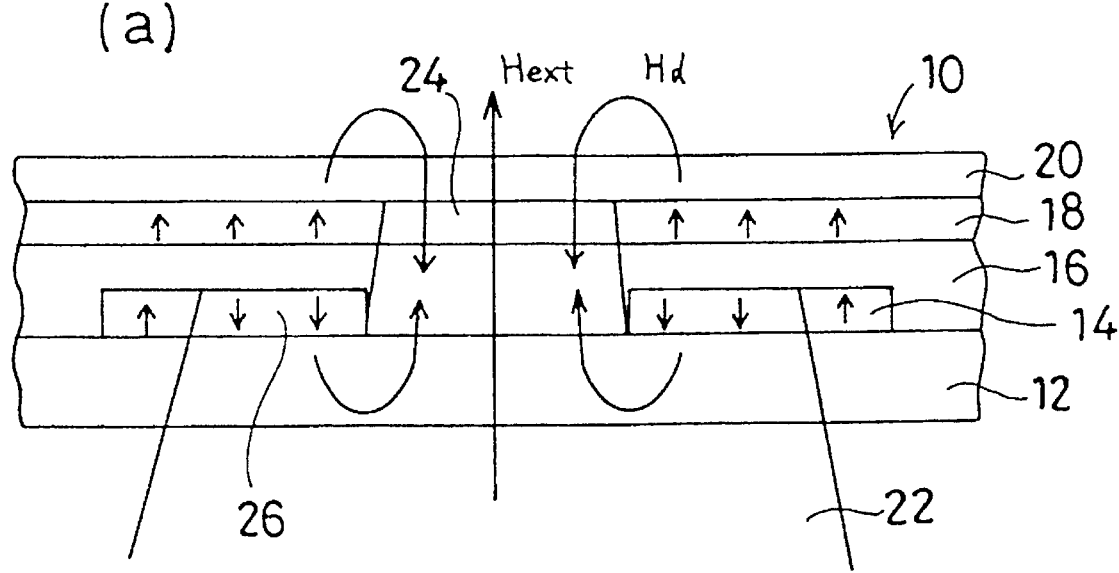
FIGS. 4(a) and (b) are the explanatory views for the principle of overwriting in the optical-magnetic recording medium.
Figure 4:
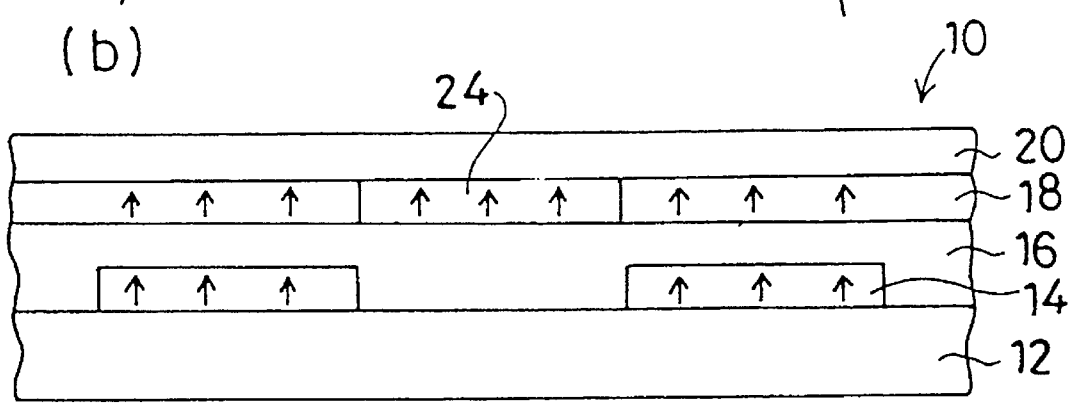

An explanation will now be provided for a case of overwriting the optical-magnetic recording medium which has information already recorded therein with reference to FIG. 4. In this case, an external magnetic field Hext is applied in the direction of the initial magnetization as shown in the figure and, under this state, both the recording layer 18 and the guide layer 14 are heated by enlarging the spot diameter of the laser beam 22, for example, as shown in FIG. 4(a). In this stage, the temperature at the light recording area (light irradiation area) 24 of the recording layer 18 is set higher than the Curie temperature $T_{c1}$, and the temperature of the light irradiation area 26 of the guide layer 14 is set higher than the compensation temperature $T_{comp}$ and lower than the Curie temperature $T_{c2}$ shown in FIG. 2. Thus, the light irradiation area 24 of the recording layer 18 is demagnetized and, on the other hand, the magnetization of the light irradiation area 26 of the guide layer 14 is reversed in the downward direction. Accordingly, the counter magnetic field $H_{d14}$ formed by the magnetization of the guide layer 14 and the counter magnetic field $H_{d18}$ formed by the magnetization of the recording layer 18 are opposite in their directions and offset with respect to each other. The counter magnetic field $H_{int}$ in the light irradiation area 24 of the recording layer 18 is thus reduced less than the external magnetic field $H_{ext}$, and consequently, the synthetic magnetic field of the two magnetic fields $H_d$ and the external magnetic field $H_{ext}$ is directed upwardly, by which overwriting in the upward magnetization direction is conducted to the light irradiation area 24 of the recording layer 18 as shown in FIG. 4(b).

When $H_{d18}$ stands for the intensity of the counter magnetic field in the recording layer 18 and $H_{d14}$ for the intensity of the counter magnetic field in the guide layer 14, it will be apparent that there is the following condition:

$$H_{d14}+H_{d18}>H_{ext}>|H_{d14}-H_{d18}|$$

On the other hand, the external magnetic field $H_{ext}$ is also applied in the direction of the initial magnetization as in FIG. 4(a) and, under this state, the spot of laser beam 22 is irradiated only to the light recording area (light irradiation area) 24 of the recording layer 18 (not illustrated). Thus, the light irradiation area 24 of the recording layer 18 is demagnetized by being heated higher than the Curie temperature $T_{c1}$. Then, since the intensity of the counter magnetic field $H_d$ in the light irradiation area 24 of the recording layer 18 is greater than the external magnetic field $H_{ext}$, as shown in FIG. 3(b), overwriting in the direction of the downward magnetization is conducted to the light irradiation area 24 of the recording layer 18.

In this way, since the magnetization in the light irradiation area 24 of the recording layer 18 can be directed upwardly or downwardly depending on the selection of whether the spot of laser beam 22 is irradiated to both the recording layer 18 and the guide layer 14 or only to the recording layer 18, the overwriting operation can be achieved by controlling the spot diameter of the laser beam 22 in accordance with the information to be overwritten. The same effect can of course be obtained also by controlling the intensity of the laser beam instead of controlling the spot diameter. Namely, overwriting can be realized by the heating of the light irradiation area 24 of the recording layer 18 higher than the Curie temperature $T_{c1}$ and the selection for heating or not heating the guide layer 14 higher than the compensation temperature Tcomp. Thus, overwriting can be conducted at a higher speed without changing the direction of applying the magnetic field by controlling the spot diameter or the intensity of laser beam as compared with the conventional magnetic field modulation system.

In the case of merely erasing and initializing the information recorded in the optical-magnetic recording medium, both the recording layer 18 and the guide layer 14 are heated by increasing the spot diameter of the laser beam 22 as shown in FIG. 4(a) so as to heat the recording layer 18 higher than the Curie temperature $T_{c1}$ and the guide layer 14 higher than the compensation temperature $T_{comp}$, thereby obtaining the initialized state since the intensity of the external magnetic field $H_{ext}$ is higher than that of the counter magnetic field $H_d$ in the light irradiation area 24 of the recording layer 18 by the demagnetization in the light irradiation area 24 of the recording layer 18 and the reversal of the magnetization in the guide layer 14 as shown in FIG. 4(a).

There is no particular limit for the recording layer and the guide layer so long as they are made of magnetic materials having such characteristics as explained above with reference to FIG. 2. In addition, there is also no particular limit to the material and the thickness of the substrate, flattening layer and protection layer. Further, the protection layer may be disposed on each one or both of the surfaces in the recording layer and the guide layer. Furthermore, the thickness of the recording layer may be reduced and a reflection layer made of Al or the like may be disposed on the protection layer.

Figure 5:
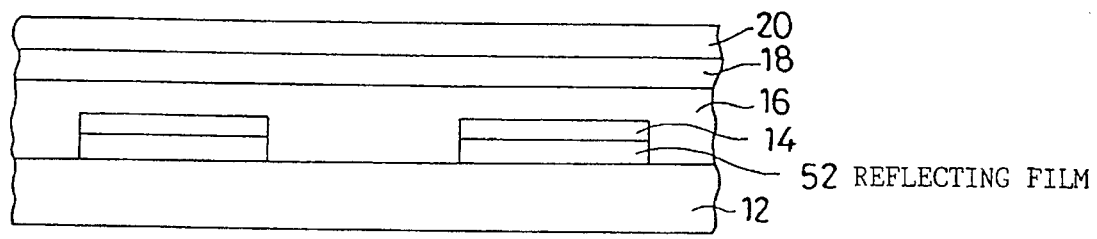
FIG. 5 through FIG. 7 are, respectively, cross sectional views for principle portions of optical-magnetic recording media in other embodiments according to the present invention.

Further, as shown in FIG. 5, a thin film 52 made of metal having high reflectance such as Al may be disposed between the guide layer 14 and the substrate 12. This can improve the tracking performance.

Figure 6:
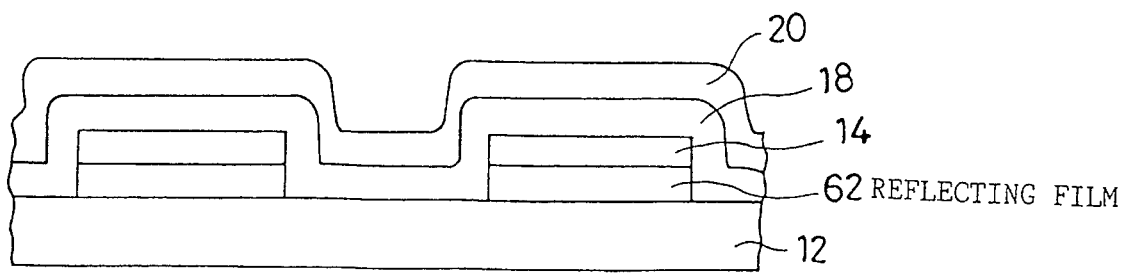

Further, as shown in FIG. 6, an auxiliary layer 62 made of metal having a reflectance different from that of the recording layer 18 may be disposed between the guide layer 14 and the substrate 12 without requirement of the flattening layer 16. If the auxiliary layer 62 is made of metal having a reflectance different from that of the recording layer 18, tracking can be conducted due to the difference in reflectance. Furthermore, if the auxiliary layer 62 is made of light permeable material, tracking can be conducted by utilizing diffraction in the recording layer 18 and the guide layer 14.

Figure 7:
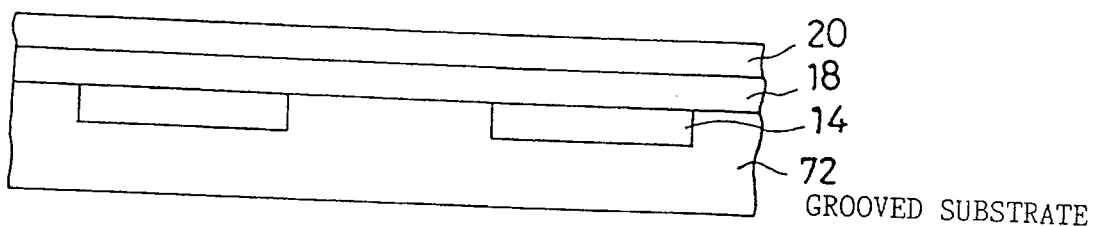

Further, as shown in FIG. 7, a grooved substrate 72 may be used. In this case, the guide layer 14 may be disposed either in the grooves or between the grooves.

Furthermore, reproduction of signals from the optical-magnetic recording medium 10 and the servo-operation for the tracking and focussing can be conducted in the same manner as in the well-known conventional optical-magnetic recording medium.

Thus, the present invention may be embodied in other specific forms without departing from the spirit or essential characteristics thereof. The present embodiments are therefore considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A magneto-optical recording device, comprising:

a substrate;

a tracking guide layer formed over the substrate and formed of a first magnetic material having a compensation temperature $T_{cp}$, and a Curie temperature $T_{c2}$, the tracking guide layer comprising multiple guide regions formed of the first magnetic material, the multiple guide regions being horizontally spaced from each other such that gaps are defined between adjoining guide regions, the gaps being devoid of the first magnetic material; and a recording layer formed over the tracking guide layer and formed of a second magnetic material having a Curie temperature $T_{c1}$, the recording layer including multiple recording regions horizontally spaced from each other such that non-recording regions are defined between adjoining recording regions, a guide region of the tracking guide layer being disposed below each non-recording region, and a gap of the tracking guide layer being disposed below each recording region;

wherein the compensation temperature $T_{cp}$ is below the Curie temperature $T_{c1}$ and the Curie temperature $T_{c1}$ is below the Curie temperature $T_{c2}$.

2. The magneto-optical recording device of claim 1, wherein when a temperature of a selected recording region is raised above the Curie temperature $T_{c1}$, a magnetic field direction of the selected recording region of the recording layer is determined by a temperature of the guide regions of the tracking guide layer which are below the non-recording regions adjacent to the selected recording region and an externally applied magnetic field.

3. The magneto-optical recording device of claim 1, further comprising a flattening layer provided between the recording layer and the tracking guide layer.

4. The magneto-optical recording device of claim 3, wherein said flattening layer is a metal oxide film.

5. The magneto-optical recording device of claim 1, wherein the guide regions of the tracking guide layer are one of concentrically formed and spirally formed over the substrate.

6. The magneto-optical recording device of claim 1, further comprising a protection layer formed over the recording layer, the protection layer protecting the recording layer from chemical change.

7. The magneto-optical recording device of claim 6, wherein the protection layer is a metal oxide film.

8. The magneto-optical recording device of claim 1, further comprising an auxiliary layer provided between the tracking guide layer and the substrate, the auxiliary layer formed of metal and having a reflectance different from a reflectance of the recording layer.

9. The magneto-optical recording device of claim 1, further comprising auxiliary layer provided between the tracking guide layer and the substrate, the auxiliary layer being made of a light-permeable material.

10. The magneto-optical recording device of claim 1, wherein, when a temperature of a selected recording region of the recording layer is raised above the Curie temperature $T_{c1}$ and a temperature of the guide regions of the tracking guide layer which are below the non-recording regions adjacent to the selected recording region is maintained below the compensation temperature $T_{cp}$, a magnetic field having a field direction opposite to a magnetic field direction of the second magnetic material of the adjacent non-recording regions is formed in the selected recording region, the magnetic field direction of the second magnetic material of the selected recording region aligning with the field direction of the magnetic field when the temperature of the selected recording region is reduced below the Curie temperature $T_{c1}$.

11. The magneto-optical recording device of claim 1, wherein, when a temperature of a selected recording region of the recording layer is raised above the Curie temperature $T_{c1}$, a temperature of at least adjacent portions of the guide regions which are below the non-recording regions adjacent to the selected recording region is raised above the compensation temperature $T_{cp}$, and an external magnetic field, having a magnetic field pointing in a same direction as a magnetic field direction of the second magnetic material of the non-recording regions of the recording layer, is applied to the selected recording region, a magnetic field having a same field direction as the external magnetic field is formed in the selected recording region, the magnetic field direction of the second magnetic material of the selected recording region aligning with the field direction of the magnetic field when the temperature of the selected recording region is reduced to below the Curie temperature $T_{c1}$ while the temperature of the adjacent portions of the adjacent guide regions is maintained above the compensation temperature $T_{cp}$.

12. A magneto-optical recording device, comprising:
a substrate defining multiple grooves;
multiple guide regions disposed in the grooves of the substrate, the guide regions formed of a first magnetic material having a compensation temperature $T_{cp}$ and a Curie temperature $T_{c2}$, the multiple guide regions being horizontally spaced from each other such that gaps are defined between adjoining guide regions, that gaps being contiguous with non-grooved regions of the substrate; and
a recording layer formed over the substrate, the plurality of guide regions, and the gaps, and formed of a second magnetic material having a Curie temperature $T_{c1}$, the recording layer including multiple recording regions horizontally spaced from each other such that non-recording regions are defined between adjoining recording regions, a guide region being disposed below each non-recording region, and a gap and non-grooved region of the substrate both being disposed below each recording region; and
wherein the compensation temperature $T_{cp}$ is below the Curie temperature $T_{c1}$ and the Curie temperature $T_{c1}$ is below the Curie temperature $T_{c2}$.

13. The magneto-optical recording device of claim 12, wherein a magnetic field direction of each recording portion of the recording layer is determined by a temperature of the guide regions of the tracking guide layer which are below the non-recording regions adjacent to the selected recording region and an externally applied magnetic field.

14. The magneto-optical recording device of claim 12, further comprising a reflecting film formed over each guide region between the recording layer and the substrate.

15. The magneto-optical recording device of claim 12, wherein the plurality of grooves are one of concentrically formed and spirally formed in said substrate.

16. The magneto-optical recording device of claim 12, further comprising a protection layer formed over the recording layer, the protection layer protecting the recording layer from chemical change.

17. The magneto-optical recording device of claim 16, wherein the protection layer is a metal oxide film.

18. The magneto-optical recording device of claim 12, further comprising a reflecting film formed over each guide region and below the recording layer, the reflecting film being made of metal having a reflectance different from a reflectance of the recording layer.

19. The magneto-optical recording device of claim 12, further comprising an auxiliary layer formed over each guide region and below the recording layer, the auxiliary layer being made of a light-permeable material.

20. The magneto-optical recording device of claim 12, wherein, when a temperature of a selected recording region of the recording layer is raised above the Curie temperature $T_{c1}$ and a temperature of the guide regions of the tracking guide layer which are below the non-recording regions adjacent to the selected recording region is maintained below the compensation temperature $T_{cp}$, a magnetic field having a field direction opposite to a magnetic field direction of the second magnetic material of the adjacent non-recording regions is formed in the selected recording region, the magnetic field direction of the second magnetic material of the selected recording region aligning with the field direction of the magnetic field when the temperature of the selected recording region is reduced below the Curie temperature $T_{c1}$.

21. The magneto-optical recording device of claim 12, wherein, when a temperature of a selected recording region of the recording layer is raised above the Curie temperature $T_{c1}$, and a temperature of at least adjacent portions of the guide regions of the tracking guide layer which are below the non-recording regions adjacent to the selected recording region is raised above the compensation temperature $T_{cp}$, and an external magnetic field, having a same magnetic field as a magnetic field direction of the second magnetic material of the non-recording regions of the recording layer, is applied to the selected recording region, a magnetic field having a same field direction as the external magnetic field is formed in the selected recording region, the magnetic field direction of the second magnetic material of the selected recording region aligning with the external magnetic field when the temperature of the selected recording region is reduced to below the Curie temperature $T_{c1}$ while the temperature of the adjacent portions of the adjacent guide regions is maintained above the compensation temperature $T_{cp}$.

22. A magneto-optical recording system, comprising:
a magneto-optical recording device, comprising:
a substrate,
a tracking guide layer formed in or over the substrate and formed of a first magnetic material having a compensation temperature $T_{cp}$ and a Curie temperature $T_{c2}$, and
a recording layer formed over the tracking guide layer and formed of a second magnetic material having a Curie temperature $T_{c1}$;
a magnetic field generator for establishing an external magnetic field extending in a first direction through the magneto-optical device; and
heating means for heating at least a selected recording region of the magneto-optical recording device;
wherein the tracking guide layer comprises multiple guide regions formed of the first magnetic material, the multiple guide regions being horizontally spaced from each other such that gaps are defined between adjoining guide regions, the gaps being devoid of the first magnetic material, and the recording layer including multiple recording regions horizontally spaced from each other such that non-recording regions are defined between adjoining recording regions, a guide region of the tracking guide layer being disposed below each non-recording region, and a gap of the tracking guide layer being disposed below each recording region; and wherein the compensation temperature $T_{cp}$ is below the Curie temperature $T_{c1}$, and the Curie temperature $T_{c1}$ is below the Curie temperature $T_{c2}$.

23. The magneto-optical recording system of claim 22, wherein a magnetic field direction of each recording portion of a recording layer is determined by a temperature of the guide regions of the tracking guide layer which are below the non-recording regions adjacent to the selected recording regions and the external magnetic field generated by the magnetic field generator.

24. The magneto-optical recording system of claim 22, wherein the heating means comprises:

a laser beam for heating at least one of the selected recording region and adjacent guide regions; and control means for varying a diameter of the laser beam.

25. The magneto-optical recording system of claim 22, wherein the heating means comprises:

a laser beam for heating at least one of the selected recording regions and adjacent guide regions; and control means for varying an intensity of the laser beam.

* * * * *